July 24, 1934.  P. J. FITZGERALD  1,967,470
ROASTER
Filed March 29, 1933   3 Sheets-Sheet 2

WITNESSES:

INVENTOR
Patrick J. Fitzgerald
HIS ATTORNEY

July 24, 1934.   P. J. FITZGERALD   1,967,470
ROASTER
Filed March 29, 1933   3 Sheets-Sheet 3

WITNESSES:

INVENTOR
Patrick J. Fitzgerald
BY
Joshua R. H. Potts
HIS ATTORNEY

Patented July 24, 1934

1,967,470

UNITED STATES PATENT OFFICE 1,967,470

ROASTER

Patrick J. Fitzgerald, Torrington, Conn., assignor to The Fitzgerald Manufacturing Company, Torrington, Conn., a corporation of Connecticut Application March 29, 1933, Serial No. 663,269

6 Claims. (Cl. 34—21)

This invention relates to a roaster, and has special reference to a roaster adapted to be used as an implement in conjunction with a utility device, such for instance as that shown and described in my co-pending application filed April 12, 1932, Serial No. 604,844, and entitled "Utility device".

The invention shown and described herein is akin to the invention shown and described in my co-pending application Serial No. 645,931, filed December 6, 1932, and entitled "Coffee roaster".

The object of the present invention is to provide an improved roaster of the type above set forth.

A second object of the invention is to provide a roaster eliminating all individual agitators for the material to be roasted.

A further object of the invention is to provide a roaster in which the container for the material to be roasted may be detached from the mechanism without disconnecting the driving parts for the same.

Still a further object of the invention is to provide cover means which may be quickly and efficiently secured to and detached from the container for the material to be roasted.

According to the invention the roaster is mounted upon the pivotal bracket of a utility device, and means is provided for supporting the roaster, which comprises a casing and a rotatable container therein, obliquely. Means are provided for quickly and conveniently attaching and detaching a container cover, and ribs are provided in the bottom of the container for agitating the material to be roasted.

Figure 1:
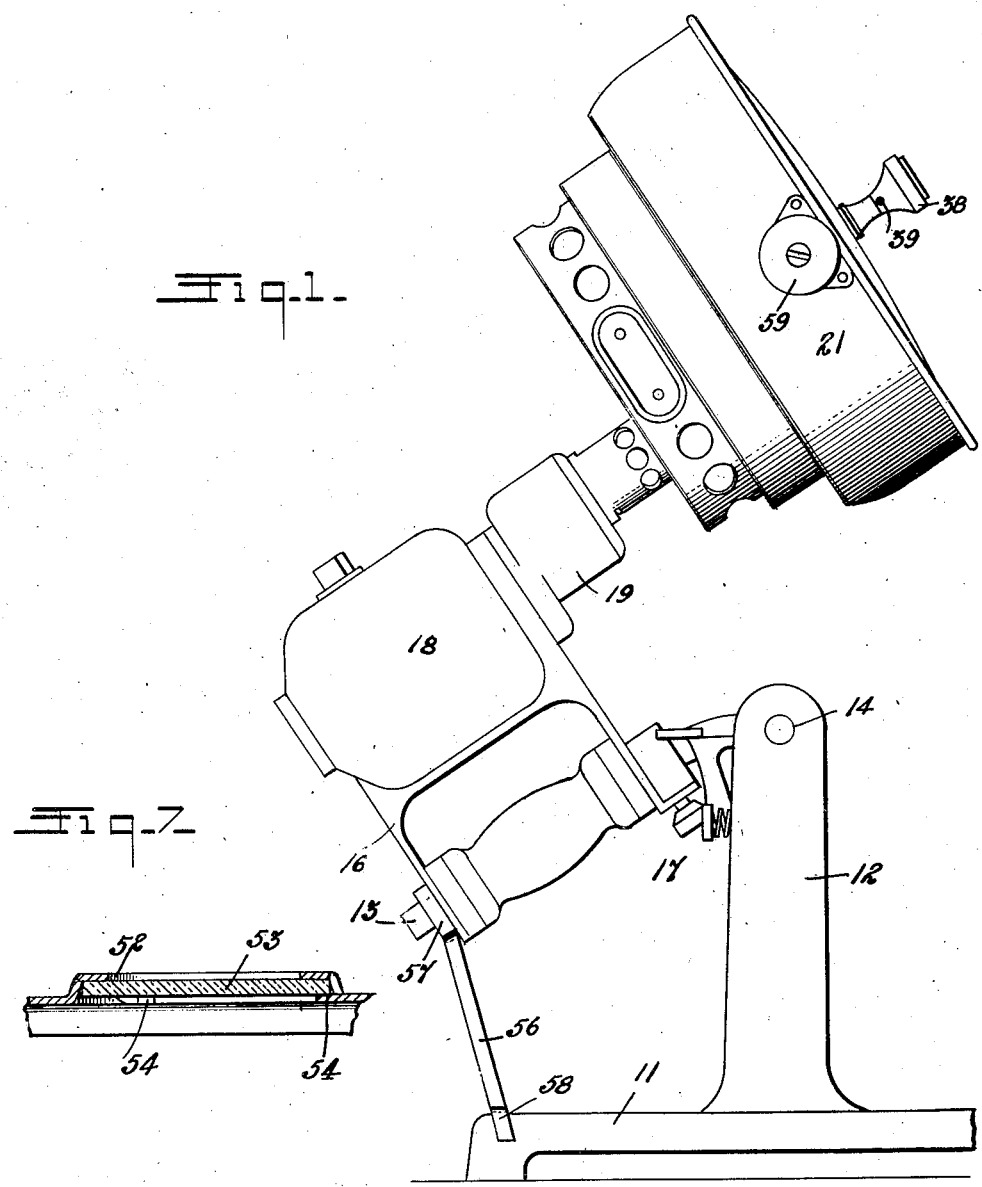
Figure 2:
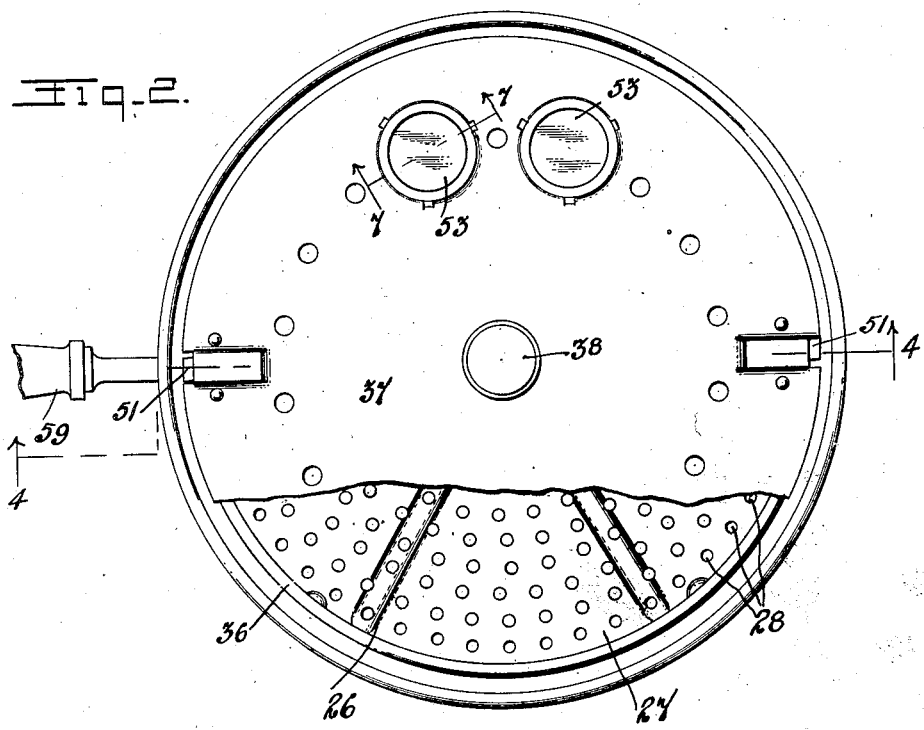
Figure 3:
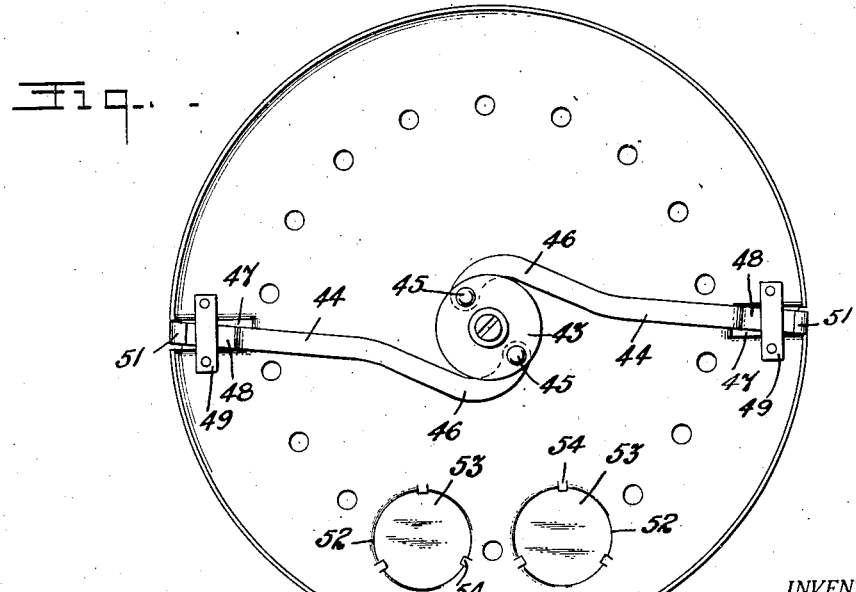
Figure 4:
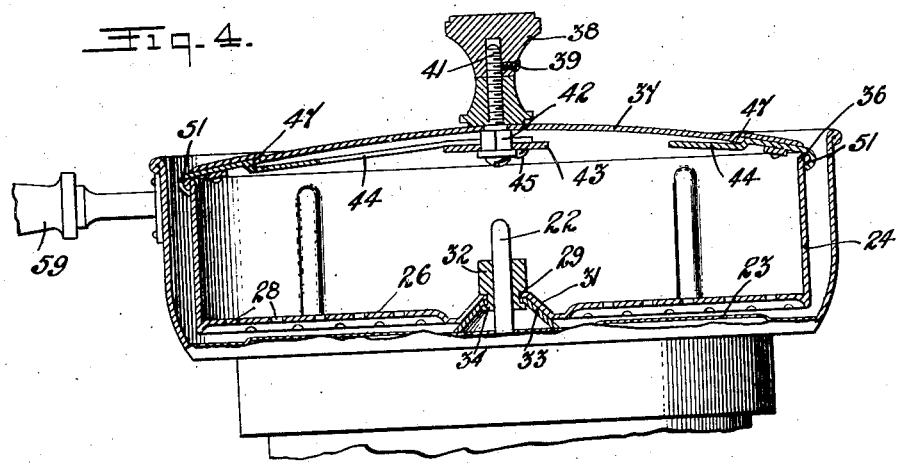
Figures 5, 6:
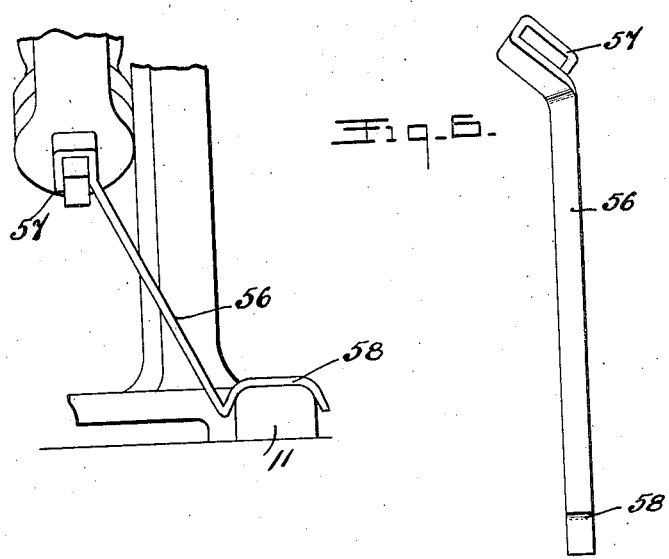

The drawings illustrate an embodiment of the invention and the views therein are as follows:

Figure 1 is a side elevation of the roaster mounted on the utility device, and shows the same supported obliquely, Figure 2 is a top plan view of the complete roaster showing a portion of the handle and the container cover broken away, Figure 3 is a bottom plan view of the container cover, Figure 4 is a vertical sectional view on the line 4—4 of Figure 2, Figure 5 is a fragmentary end view showing the means for supporting the roaster obliquely, Figure 6 is a detail view of the same, and Figure 7 is an enlarged cross-sectional view on the line 7—7 of Figure 2.

Briefly, the utility device comprises a base 11 having a standard 12 and a post 13 pivoted to said standard at 14. This post supports a bracket 16 whose position is adjusted thereon by the set screw 17, while the bracket carries a motor 18 which has a gear casing 19, while power take-off units (not shown) are adapted to be connected by parts of various utility implements.

This base and the parts hereto described are all shown and described in my last mentioned co-pending application. The roaster casing 21 is identical with the casing shown in said application, and the parts for the connection to the power take-off members and adapted to rotate the shaft 22 are all described in that application.

In the application last above described, the material to be roasted bears directly upon the metallic roasting plate 23 which is characterized as 43 in said application. In the present invention, the material to be roasted is placed in a container 24 which has a series of ribs 26 pressed upward from the bottom 27 of said container, and extending radially. The bottom of said container is also perforated with small openings 28.

At the center of the bottom 27 of the container 24, there is a hole 29, and the material 31 immediately around this hole is pressed upward into cone-shape, while the upper edge is bent inward to fit against a shoulder of the ferrule 32. A cone-shaped supporting member 33 rests within the cone-shaped portion of the container bottom, and its upper end is also bent in slightly and the lower reduced end of the ferrule 32 is peened over at 34 to hold the parts securely together. The lower edge of the supporting member 33 rests upon the roasting plate 23.

The container has a beading 36 at the upper edge of its wall. The container 24 is provided with a cover 37 which has a central knob 38 secured by a set screw 39 to a screw 41. This screw has a hexagonal or square portion 42 which fits into a similar shaped hole in a small plate 43 on the bottom of the cover.

A pair of arms 44 are attached by pivotal connections 45 to the plate 43 diametrically opposite each other by their substantially arcuate ends 46. The straight part of these arms extend in directions substantially diametrically opposite and the outer portions of the cover are pressed inward to form depressions 47 into which the slightly bent up ends 48 of said arms fit while said portions of said arms are retained in said recesses by a plate 49 which is riveted across said recess. At their extreme outer ends these arms are provided with hook-like gripping members 51 for fitting around the beading 36 on the upper part of the wall of the container 24.

The cover has a pair of closely associated holes 52 with the material around the edge thereof pressed upward to form a recess for glass sights 53, and these sights are retained in said recesses by means of a plurality of small lips 54 pressed downward and inward from the upwardly pressed walls retaining said sights.

The roaster is supported at an oblique angle by means of a support 56 formed preferably of a metal strip and having a square portion 57 for passing on to the end of the post 13, while the lower end 58 is bent to rest upon one part of the base. The casing 21 is provided with a handle 59 for connecting and disconnecting the roaster to the utility device.

The cover on the container 24 may be quickly and conveniently secured thereto, or detached therefrom by simply turning the knob 38 to rotate the plate 43, the rotation in one direction tending to retract the arms 44 and in the other direction, tending to extend the same.

The ribs 26 in the bottom of the container will insure the proper amount of agitation for uniformly roasting material placed in the container. When the container is placed in the casing and the shaft 22 rotated, the casing cannot again be removed therefrom until it is turned slightly in a direction contrary to the direction of rotation, in view of the connection between the same and the shaft 22, which is exactly the same as that shown in Figures 5 and 6 of my co-pending application last above referred to.

The roaster illustrated in the drawings and explained herein may be modified and changed in various ways without departing from the invention herein set forth and hereinafter claimed.

The invention is claimed as follows:

1. A roaster having a base and a bracket with driving means pivotally mounted thereon, a non-rotatable casing mountable on said bracket, heating means in the bottom of said casing, a container for the material to be roasted and adapted to be connected for rotation by said driving means, and means engaging the rear end of said bracket and the rear end of said base for supporting the casing and container obliquely.

2. A roaster having a base and a bracket with driving means pivotally mounted thereon, a non-rotatable casing mountable on said bracket, heating means in the bottom of said casing, a freely removable container for the material to be roasted and adapted to be connected for rotation by said driving means, and means engaging the rear end of said bracket and the rear end of said base for supporting the casing and container obliquely.

3. A roadster having a base and a bracket with driving means pivotally mounted thereon, a non-rotatable open topped casing mountable on said bracket, heating means in the bottom of said casing, a freely removable container for the material to be roasted and adapted to be connected for rotation by said driving means, and means engaging the rear end of said bracket and the rear end of said base for supporting the casing and container obliquely.

4. A roaster having a base and a bracket with driving means pivotally mounted thereon, a non-rotatable casing mountable on said bracket, heating means in the bottom of said casing, a freely removable container for the material to be roasted and adapted to be connected for rotation by said driving means, ribs in the bottom and side walls of said container, and means engaging the rear end of said bracket and the rear end of said base for supporting the casing and container obliquely.

5. A roaster having a base and a bracket with driving means pivotally mounted thereon, a non-rotatable casing mountable on said bracket, heating means in the bottom of said casing, a container for the material to be roasted and adapted to be connected for rotation by said driving means, an extension on said bracket, and means engaging the said extension and said base for supporting said casing and container obliquely.

6. A roaster having a base and a bracket with driving means pivotally mounted thereon, a non-rotatable casing mountable on said bracket, heating means in the bottom of said casing, a container for the material to be roasted and adapted to be connected for rotation by said driving means, an extension on said bracket, and a supporting member having a socket on one end fitting onto said extension and a U-shaped portion on its other end for engaging the base for disposing said casing and contained in inclined position.

PATRICK J. FITZGERALD.